United States Patent
Lee et al.

(10) Patent No.: US 11,283,532 B2
(45) Date of Patent: Mar. 22, 2022

(54) METHOD FOR TESTING WIRELESS COMMUNICATION MODULE AND ELECTRONIC DEVICE INCLUDING THE WIRELESS COMMUNICATION MODULE

(71) Applicant: Samsung Electronics Co., Ltd., Suwon-si (KR)

(72) Inventors: Jooseok Lee, Suwon-si (KR); Jeongho Lee, Suwon-si (KR); Juho Son, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 12 days.

(21) Appl. No.: 16/725,323

(22) Filed: Dec. 23, 2019

(65) Prior Publication Data

US 2020/0213017 A1     Jul. 2, 2020

(30) Foreign Application Priority Data

Dec. 26, 2018   (KR) ........................ 10-2018-0169880

(51) Int. Cl.
*H01B 17/12*    (2006.01)
*H04B 17/12*   (2015.01)
(Continued)

(52) U.S. Cl.
CPC ............. *H04B 17/12* (2015.01); *H01Q 1/246* (2013.01); *H01Q 3/2605* (2013.01); *H01Q 3/36* (2013.01); *H04B 7/0617* (2013.01)

(58) Field of Classification Search
CPC ...... H04B 17/12; H04B 7/0617; H01Q 1/246; H01Q 3/2605; H01Q 3/36
(Continued)

(56) References Cited

U.S. PATENT DOCUMENTS 6,127,966 A * 10/2000 Erhage .................. G01S 7/4026
                                                    342/174
8,754,811 B1 * 6/2014 Uscinowicz ........... H01Q 3/267
                                                    342/375
(Continued)

FOREIGN PATENT DOCUMENTS

CN    107765104 A    3/2018
EP    0805510 A2    11/1997
(Continued)

OTHER PUBLICATIONS

Bodhisatwa Sadhu et al., A 28-GHz 32-Element TRX Phased-Array IC With Concurrent Dual-Polarized Operation and Orthogonal Phase and Gain Control for 5G communication, IEEE Journal of Solid-State Circuits, Nov. 15, 2017, vol. 52, No. 12.

(Continued)

*Primary Examiner* — Danh C Le
(74) *Attorney, Agent, or Firm* — Jefferson IP Law, LLP

(57) ABSTRACT

A communication method and a system for converging a 4th-Generation (4G) communication system or a 5th-Generation (5G) communication system for supporting higher data rates beyond a 4th-Generation (4G) system with a technology for Internet of Things (IoT) are provided. The disclosure may be applied to intelligent services based on the 5G communication technology and the IoT-related technology, such as smart home, smart building, smart city, smart car, connected car, health care, digital education, smart retail, security and safety services. The disclosure provides an electronic device including a wireless communication module. The wireless communication module includes an antenna array including at least one antenna element, a phase shifter configured to control a phase of a beam radiating from the antenna array, a processor electrically connected to the phase shifter and configured to (Continued)

perform beamforming by controlling the phase shifter, and a memory including phase offset information of the wireless communication module.

16 Claims, 10 Drawing Sheets

(51) Int. Cl.
*H01Q 3/36* (2006.01)
*H04B 7/06* (2006.01)
*H01Q 1/24* (2006.01)
*H01Q 3/26* (2006.01)

(58) Field of Classification Search
USPC .............. 370/329, 310.2; 455/550.1, 562.1
See application file for complete search history.

(56) References Cited

U.S. PATENT DOCUMENTS

| | | | | |
|---|---|---|---|---|
| 10,620,297 | B2* | 4/2020 | Cohen | G01S 7/006 |
| 2004/0252055 | A1* | 12/2004 | Thomas | H01Q 1/246 |
| | | | | 342/372 |
| 2010/0214073 | A1* | 8/2010 | Kasai | G01S 13/878 |
| | | | | 340/10.2 |
| 2011/0122977 | A1* | 5/2011 | Ludwig | H03D 13/007 |
| | | | | 375/346 |
| 2013/0059553 | A1 | 3/2013 | Orihashi et al. | |
| 2015/0365126 | A1 | 12/2015 | Shimura | |
| 2016/0308597 | A1 | 10/2016 | Kim et al. | |
| 2017/0012349 | A1 | 1/2017 | Lee et al. | |
| 2017/0222849 | A1* | 8/2017 | Shimura | H04L 27/22 |
| 2018/0110038 | A1* | 4/2018 | Ruan | H04B 17/21 |
| 2018/0295648 | A1* | 10/2018 | Chen | H04W 74/08 |
| 2020/0358177 | A1 | 11/2020 | Ge et al. | |
| 2021/0011121 | A1* | 1/2021 | Arbabian | G01S 7/4021 |

FOREIGN PATENT DOCUMENTS

| | | |
|---|---|---|
| EP | 2958255 A1 | 12/2015 |
| JP | 2006-304205 A | 11/2006 |
| KR | 10-2016-0067203 A | 6/2016 |

OTHER PUBLICATIONS

Bodhisatwa Sadhu et al., A 28GHz 32-Element Phased-Array Transceiver IC with Concurrent Dual Polarized Beams and 1.4 Degree Beam-Steering Resolution for 5G Communication, ISSCC 2017 / Session 7 / Wireless Transceivers / 7.2, Feb. 5, 2017-Feb. 9, 2017.

Arun Natarajan et al., A Fully-Integrated 16-Element Phased-Array Receiver in SiGe BiCMOS for 60-GHz Communications, IEEE Journal of Solid-State Circuits, Apr. 21, 2011, vol. 46, No. 5.

International Search Report dated Apr. 14, 2020, issued in International Application No. PCT/KR2019/018443.

Partial Supplementary European Search Report dated Aug. 13, 2021, issued in a counterpart European Application No. 19904586.5.

Extended European Search Report dated Dec. 21, 2021, issued in a counterpart European Application No. 19904586.5.

Adithya Angampally Hari et al.: "Experimental evaluation of a beamforming array calibration system", 2014 IEEE Aerospace Conference, IEEE, Mar. 1, 2014, pp. 1-7, XP032607422.

* cited by examiner

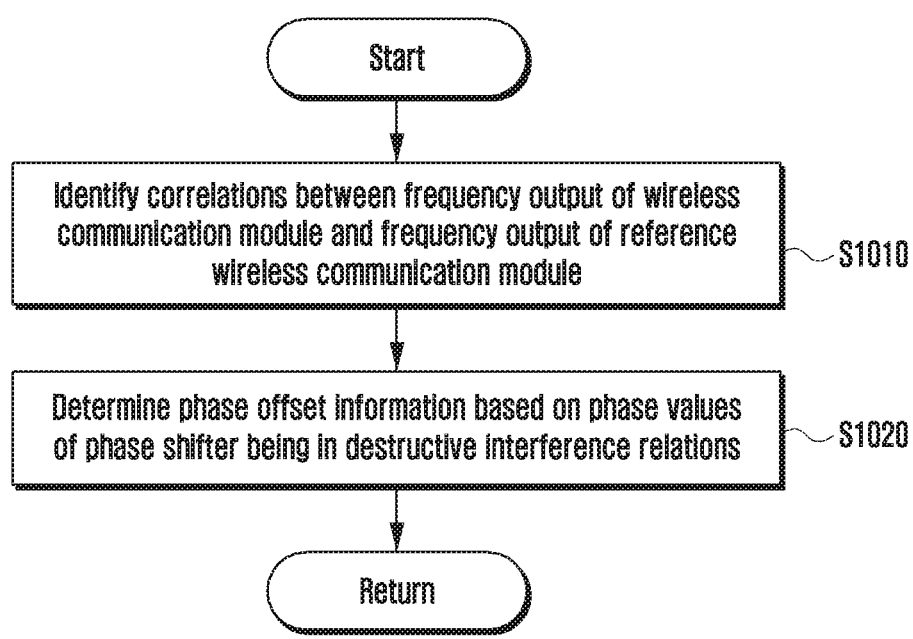

METHOD FOR TESTING WIRELESS COMMUNICATION MODULE AND ELECTRONIC DEVICE INCLUDING THE WIRELESS COMMUNICATION MODULE

CROSS-REFERENCE TO RELATED APPLICATION(S)

This application is based on and claims priority under 35 U.S.C. § 119(a) of a Korean patent application number 10-2018-0169880, filed on Dec. 26, 2018, in the Korean Intellectual Property Office, the disclosure of which is incorporated by reference herein in its entirety.

BACKGROUND

1. Field

The disclosure provides a method and an apparatus for efficiently testing a wireless communication module in a wireless communication system in which beamforming is performed.

2. Description of Related Art

To meet the increasing demand for wireless data traffic since the deployment of 4th-Generation (4G) communication systems, efforts have been made to develop an improved 5th-Generation (5G) or pre-5G communication system. Therefore, the 5G or pre-5G communication system is also called a "beyond 4G network" communication system or a "post Long Term Evolution (LTE) System." Implementation of the 5G communication system in ultrahigh frequency (mmWave) bands, e.g., 60 GHz bands, is being considered in order to accomplish higher data rates. To mitigate a path loss of the radio waves and increase the transmission distance on the radio waves in the ultrahigh frequency bands, beamforming, massive multiple-input multiple-output (massive MIMO), full dimensional MIMO (FD-MIMO), array antenna, analog beamforming, and large scale antenna techniques are being discussed for 5G communication systems. In addition, in 5G communication systems, development for system network improvement is under way based on evolved small cells, advanced small cells, cloud radio access networks (cloud RANs), ultra-dense networks, device-to-device (D2D) communication, wireless backhaul, moving network, cooperative communication, coordinated multi-points (CoMP), reception-end interference cancellation, and the like. In addition, in the 5G system, hybrid FSK and QAM modulation (FQAM) and sliding window superposition coding (SWSC), as advanced coding modulation (ACM) systems, and filter bank multi carrier (FBMC), non-orthogonal multiple access (NOMA), and sparse code multiple access (SCMA), as advanced access technologies, have been developed.

On the other hand, the Internet, which is a human centered connectivity network where humans generate and consume information, is now evolving to the Internet of things (IoT) where distributed entities, such as things, exchange and process information without human intervention. The Internet of everything (IoE), which is a combination of IoT technology and big data processing technology through connection with a cloud server, has emerged. Technology elements, such as "sensing technology", "wired/wireless communication and network infrastructure", "service interface technology", and "security technology" have been demanded for IoT implementation; therefore, technologies, such as a sensor network, machine-to-machine (M2M) communication, machine type communication (MTC) for a connection between things, are recently researched. Such an IoT environment may provide intelligent Internet technology (IT) services that create a new value for human life by collecting and analyzing data generated among connected things. IoT may be applied to a variety of fields including smart home, smart building, smart city, smart car or connected car, smart grid, health care, smart appliances, and advanced medical services through convergence and combination between existing information technology (IT) and various industrial applications.

In line with this, various attempts have been made to apply 5G communication systems to IoT networks. For example, technologies such as a sensor network, machine-to-machine (M2M) communication, and machine type communication (MTC) may be implemented by beamforming, MIMO, and array antennas, which correspond to 5G communication technology. Application of a cloud radio access network (cloud RAN) as the above-described big data processing technology may also be considered to be an example of convergence between the 5G technology and the IoT technology.

The above information is presented as background information only to assist with an understanding of the disclosure. No determination has been made, and no assertion is made, as to whether any of the above might be applicable as prior art with regard to the disclosure.

SUMMARY

In the next-generation mobile communication system to which beamforming is applied, the number of wireless communication modules included in an electronic device may be increased. Accordingly, the time required to test the performances of the wireless communication modules included in the electronic device may also be increased.

Aspects of the disclosure are to address at least the above-mentioned problems and/or disadvantages and to provide at least the advantages described below. Accordingly, an aspect of the disclosure is to provide a method and an apparatus for efficiently testing a wireless communication module in a wireless communication system in which beamforming is performed.

Additional aspects will be set forth in part in the description which follows and, in part, will be apparent from the description, or may be learned by practice of the presented embodiments.

In accordance with an aspect of the disclosure, an electronic device is provided. The electronic device includes a wireless communication module, wherein the wireless communication module includes an antenna array including at least one antenna element, a phase shifter configured to control a phase of a beam radiating from the antenna array, a processor electrically connected to the phase shifter and configured to perform beamforming by controlling the phase shifter, and a memory including phase offset information of the wireless communication module.

In accordance with another aspect of the disclosure, a method for testing a wireless communication module is provided. The method includes acquiring phase offset information stored in a memory of the wireless communication module, adjusting a phase shifter of the wireless communication module based on the phase offset information, and testing an output power and beamforming performance of the wireless communication module.

In accordance with another aspect of the disclosure, a base station is provided. The base station includes a wireless communication module, wherein the wireless communication module includes an antenna array including at least one antenna element, a phase shifter configured to control a phase of a beam radiating from the antenna array, a processor electrically connected to the phase shifter and configured to perform beamforming by controlling the phase shifter, and a memory including phase offset information of the wireless communication module.

According to the embodiments of the disclosure, the time required to test the performance of the wireless communication module can be reduced. In addition, according to the embodiments disclosed in the disclosure, the beamforming can be performed in consideration of the performances of the respective wireless communication modules.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features and advantages of certain embodiments of the disclosure will be more apparent from the following description, taken in conjunction with the accompanying drawings, in which:

FIG. 10 is a flowchart illustrating a method for determining phase offset information according to an embodiment of the disclosure.

Throughout the drawings, like reference numerals will be understood to refer to like parts, components, and structures.

DETAILED DESCRIPTION

Figure 1:
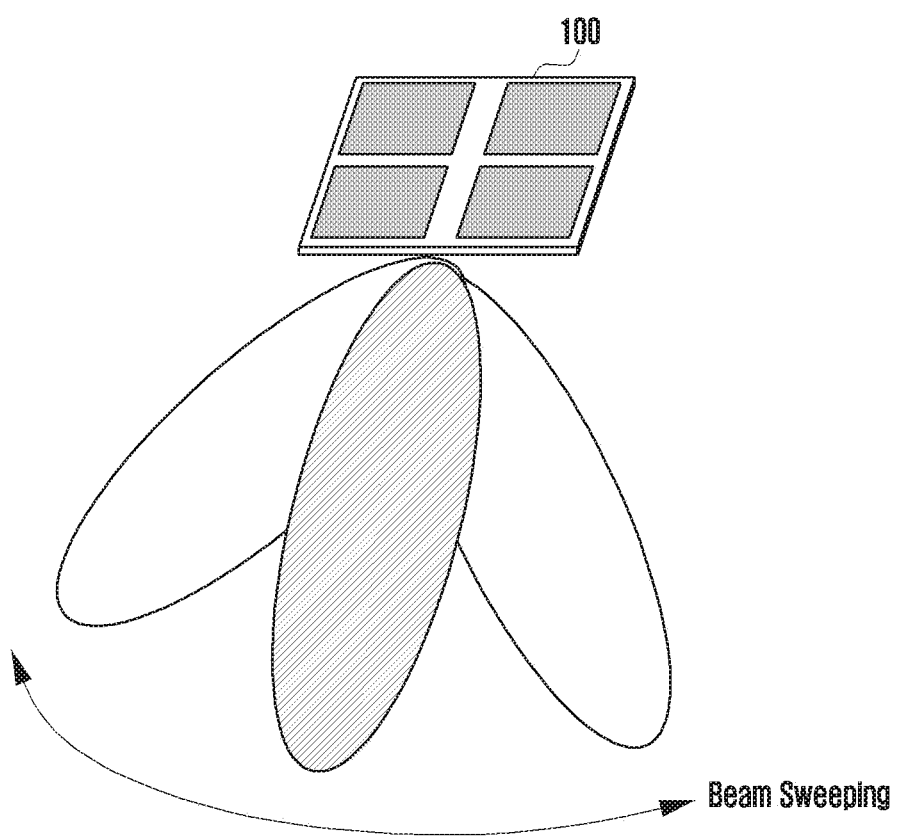
FIG. 1 is a diagram illustrating beam sweeping through a wireless communication module according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, in the accompanying drawings, sizes and relative sizes of some constituent elements may be exaggerated, omitted, or briefly illustrated. Further, sizes of the respective constituent elements do not completely reflect the actual sizes thereof. In the drawings, the same drawing reference numerals are used for the same or corresponding elements across various figures.

The aspects and features of the disclosure and methods for achieving the aspects and features will be apparent by referring to the embodiments to be described in detail with reference to the accompanying drawings. However, the disclosure is not limited to the embodiments disclosed hereinafter, and it can be implemented in diverse forms. The matters defined in the description, such as the detailed construction and elements, are only specific details provided to assist those of ordinary skill in the art in a comprehensive understanding of the disclosure, and the disclosure is only defined within the scope of the appended claims. In the entire description of the disclosure, the same drawing reference numerals are used for the same elements across various figures.

In this case, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations for implementing the functions specified in the flowchart block or blocks.

Also, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

In this case, the term "~unit", as used in an embodiment, means, but is not limited to, a software or hardware component, such as field programmable gate array (FPGA) or application specific integrated circuit (ASIC), which performs certain tasks. However, "~unit" is not meant to be limited to software or hardware. The term "~unit" may advantageously be configured to reside on the addressable storage medium and configured to execute on one or more processors. Thus, "~unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "~units" may be combined into fewer components and "~units" or further separated into additional components and "~units". Further, the components and "~units" may be implemented to operate one or more central processing units (CPUs) in a device or a security multimedia card. Further, in an embodiment, "~unit" may include one or more processors.

FIG. 1 is a diagram illustrating beam sweeping through a wireless communication module according to an embodiment of the disclosure.

Referring to FIG. 1, according to an embodiment, in the next-generation mobile communication system using mm-Wave bands, a new method that is different from the wireless communication method in the related art should be considered. In particular, in the mm-Wave bands, as the frequency becomes higher, a gain loss of a beam radiating through a wireless communication module may become higher.

According to an embodiment, in the next-generation mobile communication system using the mm-Wave bands, a multi-chain structure may be used to minimize the gain loss of the beam. For example, as illustrated in FIG. 1, one wireless communication module 100 may have four multi-chains, and the wireless communication module 100 may perform beam sweeping by forming beams through the multi-chains. According to various embodiments, the multi-chains may mean a plurality of radio frequency (RF) chains.

According to various embodiments, in contrast with the wireless communication module 100 as illustrated in FIG. 1, if necessary, up to 32 chains may be implemented in one wireless communication module. However, in the next-generation mobile communication system, according to circumstances, 256 or 1024 or more chains may be necessary in one electronic device. Accordingly, in order to solve the above-described problems, a method for configuring multi-chains using a plurality of wireless communication modules may be considered.

Figure 2:
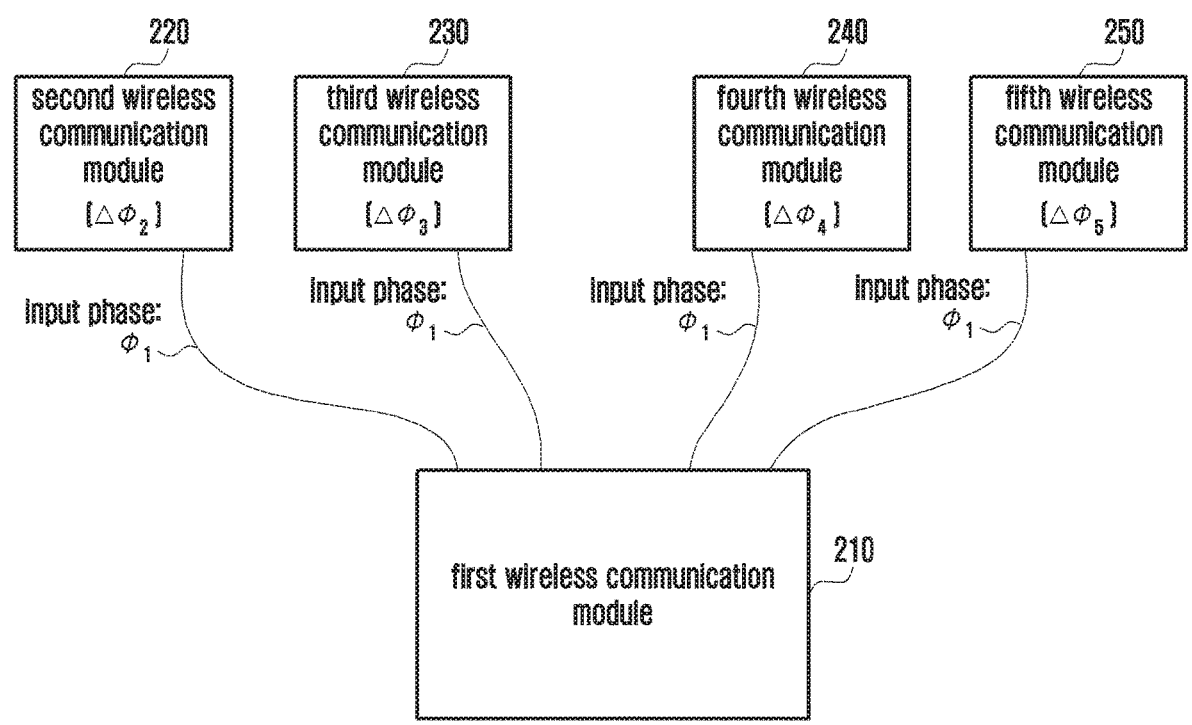
FIG. 2 is a diagram illustrating an electronic device including a plurality of wireless communication modules according to an embodiment of the disclosure.

FIG. 2 is a diagram illustrating an electronic device including a plurality of wireless communication modules according to an embodiment of the disclosure.

Referring to FIG. 2, according to an embodiment, an electronic device may include five wireless communication modules 210, 220, 230, 240, and 250. According to various embodiments, the five wireless communication modules 210, 220, 230, 240, and 250 may perform beamforming in mm-Wave bands.

According to an embodiment, the second wireless communication module 220, the third wireless communication module 230, the fourth wireless communication module 240, and the fifth wireless communication module 250 may be deployed at ends of the electronic device to radiate beams to an outside of the electronic device. For example, the second wireless communication module 220, the third wireless communication module 230, the fourth wireless communication module 240, and the fifth wireless communication module 250 may be front-end chips. According to various embodiments, the second wireless communication module 220, the third wireless communication module 230, the fourth wireless communication module 240, and the fifth wireless communication module 250 may include a plurality of RF chains. In the case of using the above-described embodiment, the number of RF chains of the electronic device including the first wireless communication module 210, the second wireless communication module 220, the third wireless communication module 230, the fourth wireless communication module 240, and the fifth wireless communication module 250 may be 64 (64 RF chains=16 RF chains*4).

According to an embodiment, the first wireless communication module 210 may transmit a signal having an input phase of $\varphi_1$ to the second wireless communication module 220, the third wireless communication module 230, the fourth wireless communication module 240, and the fifth wireless communication module 250. According to various embodiments, based on the above-described signal, the second wireless communication module 220, the third wireless communication module 230, the fourth wireless communication module 240, and the fifth wireless communication module 250 may generate beams in a specific direction.

According to an embodiment, the second wireless communication module 220 having received the signal having the phase of $\varphi_1$ may change the phase of $\varphi_1$ as much as $\Delta\varphi_2$ in order to form the beam in the specific direction. According to various embodiments, the third wireless communication module 230 may change the phase of $\varphi_1$ as much as $\Delta\varphi_3$ in order to form the beam in the specific direction, and the fourth wireless communication module 240 may change the phase of $\varphi_1$ as much as $\Delta\varphi_4$ in order to form the beam in the specific direction. The fifth wireless communication module 250 may change the phase of $\varphi_1$ as much as $\Delta\varphi_5$ in order to form the beam in the specific direction.

According to an embodiment, the phase value $\Delta\varphi_2$ intended to be changed through the second wireless communication module 220 may be different from the phase value being actually changed by the second wireless communication module 220. For example, the phase value intended to be changed through the second wireless communication module 220 may be 30°, whereas the phase value being actually changed by the second wireless communication module 220 may be 20°. According to various embodiments, the difference between the above-described phase values may be caused by process dispersion occurring in the process of manufacturing the wireless communication module. For example, due to the difference between values of elements, such as transistors, capacitors, and inductors, included in the wireless communication module, there may be the difference between the phase value intended to be changed through the wireless communication modules and the phase value being actually changed.

According to an embodiment, the difference between the phase value intended to be changed through the wireless communication modules and the phase value being actually changed may be increased as the frequency band intended to be radiated through the wireless communication module becomes heightened. For example, in the mm-Wave frequency bands being used in the next-generation mobile communication system, the difference between the phase values may be increased in comparison with an LTE communication system. According to various embodiments, as the number of blocks cascaded in the wireless communication module or the number of functions of the wireless communication module becomes larger, the difference between the phase values may become greater.

According to an embodiment, in all of the second wireless communication module 220, the third wireless communication module 230, the fourth wireless communication module 240, and the fifth wireless communication module 250 included in the electronic device, the difference between the phase value intended to be changed through the wireless communication module and the phase value being actually changed by the wireless communication module may exist. According to various embodiments, the electronic device may perform an accurate beamforming operation by identifying the difference between the phase value intended to be changed through each wireless communication module and the phase value being actually changed by each wireless communication module.

Figure 3:
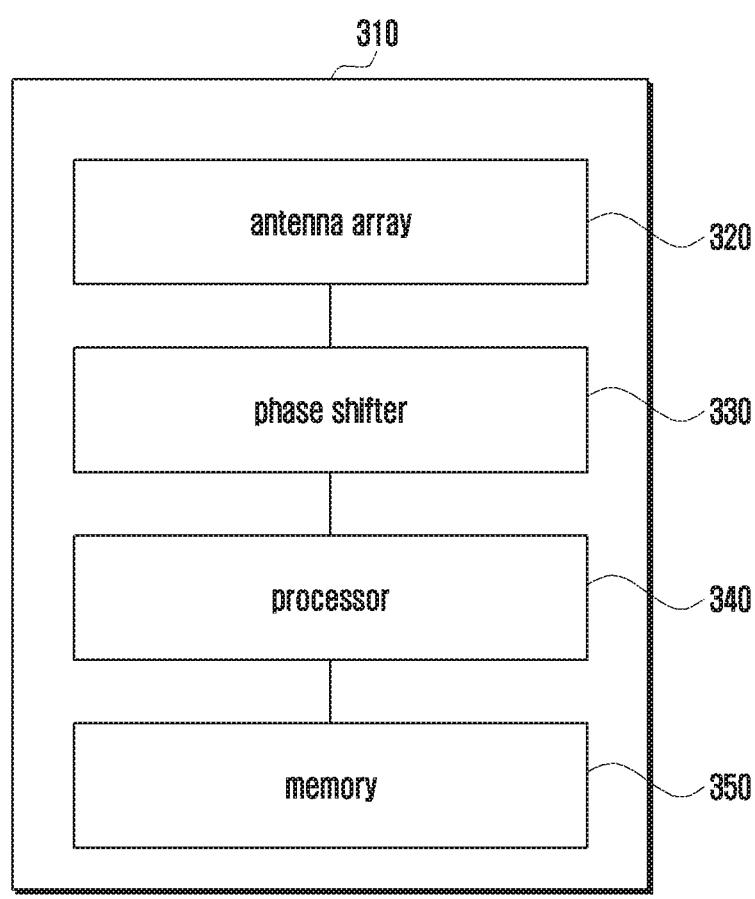
FIG. 3 is a diagram illustrating the structure of a wireless communication module according to an embodiment of the disclosure.

FIG. 3 is a diagram illustrating the structure of a wireless communication module according to an embodiment of the disclosure.

Referring to FIG. 3, according to an embodiment, an electronic device may include at least one wireless communication module 310. For example, the wireless communication module 310 may be deployed at an end of the electronic device to radiate a beam to an outside of the electronic device.

According to an embodiment, the wireless communication module 310 may include an antenna array 320 including at least one antenna element, a phase shifter 330 configured to control a phase of a beam radiating from the antenna array 320, a processor 340 electrically connected to the phase shifter 330 and configured to perform beamforming by controlling the phase shifter 330, and a memory 350 including phase offset information of the wireless communication module 310.

According to an embodiment, the phase offset information of the wireless communication module stored in the memory 350 may be determined based on a phase difference between the wireless communication module 310 and a reference wireless communication module. According to various embodiments, the reference wireless communication module may have the characteristic that is equal or similar to the characteristic of the wireless communication module 310 (even if the reference wireless communication module and the wireless communication module are manufactured to have the same characteristic, the characteristics of both the modules may be different from each other due to semiconductor process dispersion).

According to an embodiment, it is possible to test the performance of the wireless communication module based on the phase offset information stored in the memory 350. According to various embodiments, by testing the performance of the wireless communication module through acquisition of the phase offset information stored in the memory 350, the time and costs required to test the wireless communication module can be reduced.

On the other hand, FIG. 3 is a diagram illustrating the structure of the wireless communication module according to an embodiment disclosed in the disclosure. Accordingly, the structure of the wireless communication module disclosed in the disclosure should not be limited to the structure of the wireless communication module as illustrated in FIG. 3. For example, the processor 340 may also be directly and electrically connected to the antenna array 320.

Figure 4:
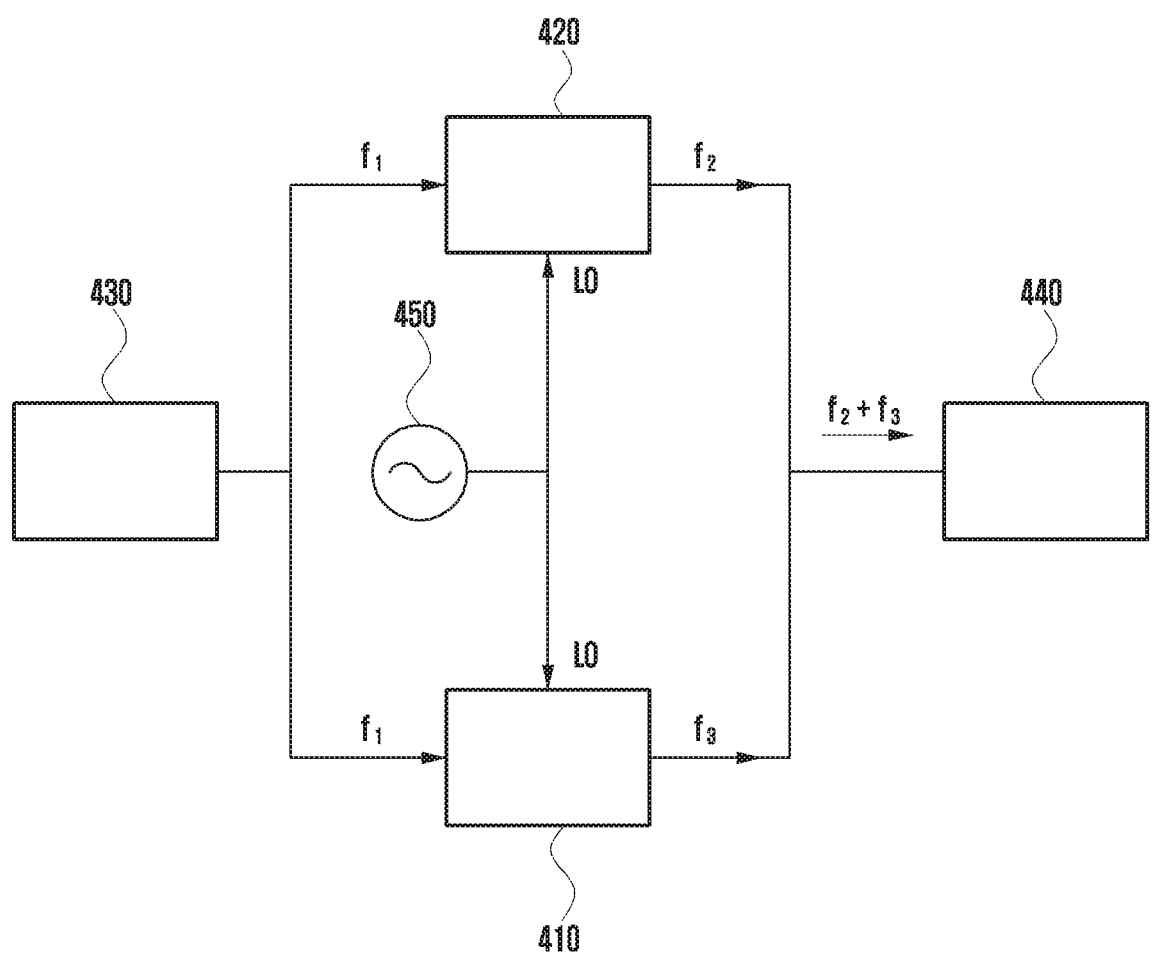
FIG. 4 is a diagram illustrating a method for determining phase offset information according to an embodiment of the disclosure.

FIG. 4 is a diagram illustrating a method for determining phase offset information according to an embodiment of the disclosure.

Referring to FIG. 4, according to an embodiment, phase offset information of a wireless communication module may be determined based on a phase difference between a wireless communication module 410 and a reference wireless communication module 420. According to various embodiments, the reference wireless communication module 420 may have the characteristic that is equal or similar to the characteristic of the wireless communication module 410.

According to an embodiment, in order to identify the phase difference between the wireless communication module 410 and the reference wireless communication module 420, a signal generator 430 may transmit the same signal $f_1$ to the wireless communication module 410 and the reference wireless communication module 420. According to various embodiments, the wireless communication module 410 and the reference wireless communication module 420 may receive a local oscillator (LO) signal for changing the phase of the $f_1$ signal received from the signal generator 430 from a local oscillator (LO) generator 450.

According to an embodiment, the wireless communication module 410 may output an $f_3$ signal based on the $f_1$ signal and the LO signal. For example, there may be a difference as much as $\varphi_1$ between the phase of the $f_3$ signal and the phase of the $f_1$ signal. According to various embodiments, the reference wireless communication module 420 may output an $f_2$ signal based on the $f_1$ signal and the LO signal. For example, there may be a difference as much as $\varphi_2$ between the phase of the $f_2$ signal and the phase of the $f_1$ signal.

According to an embodiment, even if the wireless communication module 410 and the reference wireless communication module 420 are manufactured to have the same characteristic, the phase of $\varphi_1$ that is changed by the wireless communication module 410 and the phase of $\varphi_2$ that is changed by the reference wireless communication module 420 may have different values due to the semiconductor process dispersion. Accordingly, in order to accurately test the performance of the wireless communication module 410, it is necessary to know the phase dispersion occurring in the wireless communication module 410 due to the semiconductor process dispersion.

According to an embodiment, in order to acquire the phase dispersion occurring in the wireless communication module 410, the $f_3$ signal output from the wireless communication module 410 and the $f_2$ signal output from the reference wireless communication module 420 may be added and transmitted to a spectrum analyzer 440. According to various embodiments, by adjusting a phase shifter included in the wireless communication module 410, the phase dispersion of the wireless communication module 410 may be identified based on the characteristic of the $(f_2+f_3)$ signal being analyzed by the spectrum analyzer 440.

According to an embodiment, the output signal $f_2$ of the wireless communication module 410 and the output signal $f_3$ of the reference wireless communication module 420 may act mutually as constructive interferences through adjustment of the phase shifter included in the wireless communication module 410. According to various embodiments, it may be identified through the spectrum analyzer 440 whether the $f_2$ signal and the $f_3$ signal act mutually as constructive interferences.

According to an embodiment, if the sum of the $f_2$ signal and the $f_3$ signal being identified through the spectrum analyzer 440 has the maximum value, it can be identified that the $f_2$ signal and the $f_3$ signal act mutually as the constructive interferences. According to various embodiments, if the $f_2$ signal and the $f_3$ signal act mutually as the constructive interferences, the phase dispersion value of the wireless communication module 410 may be determined based on the phase change value by the phase shifter of the wireless communication module 410. For example, the phase dispersion of the wireless communication module 410 may be determined based on Equation 1 below.

$$\Delta\varphi = -\varphi_{PS} \qquad \text{Equation 1}$$

Here, $\Delta\varphi$ denotes phase dispersion of the wireless communication module, and $\Phi_{PS}$ denotes a phase change value by the phase shifter of the wireless communication module.

According to an embodiment, the output signal $f_2$ of the wireless communication module 410 and the output signal $f_3$ of the reference wireless communication module 420 may act mutually as destructive interferences through adjustment of the phase shifter included in the wireless communication module 410. According to various embodiments, it may be identified through the spectrum analyzer 440 whether the $f_2$ signal and the $f_3$ signal act mutually as destructive interferences.

According to an embodiment, if the sum of the $f_2$ signal and the $f_3$ signal being identified through the spectrum analyzer 440 has the minimum value, it can be identified that the $f_2$ signal and the $f_3$ signal act mutually as the destructive interferences. According to various embodiments, if the $f_2$ signal and the $f_3$ signal act mutually as the destructive interferences, the phase dispersion value of the wireless communication module 410 may be determined based on the phase change value by the phase shifter of the wireless communication module 410. For example, the phase dispersion of the wireless communication module 410 may be determined based on Equation 2 below.

$$\Delta\varphi = 180° - \varphi_{PS} \qquad \text{Equation 2}$$

Here, $\Delta\varphi$ denotes phase dispersion of the wireless communication module, and $\Phi_{PS}$ denotes a phase change value by the phase shifter of the wireless communication module.

According to an embodiment, The phase dispersion value of the wireless communication module 410 may be determined based on the Equation 1 or 2. According to various embodiments, the determined phase dispersion value may be stored in a memory of the wireless communication module or a register provided inside the processor, and the stored phase dispersion value may be used in a performance test of the wireless communication module.

Figure 5:
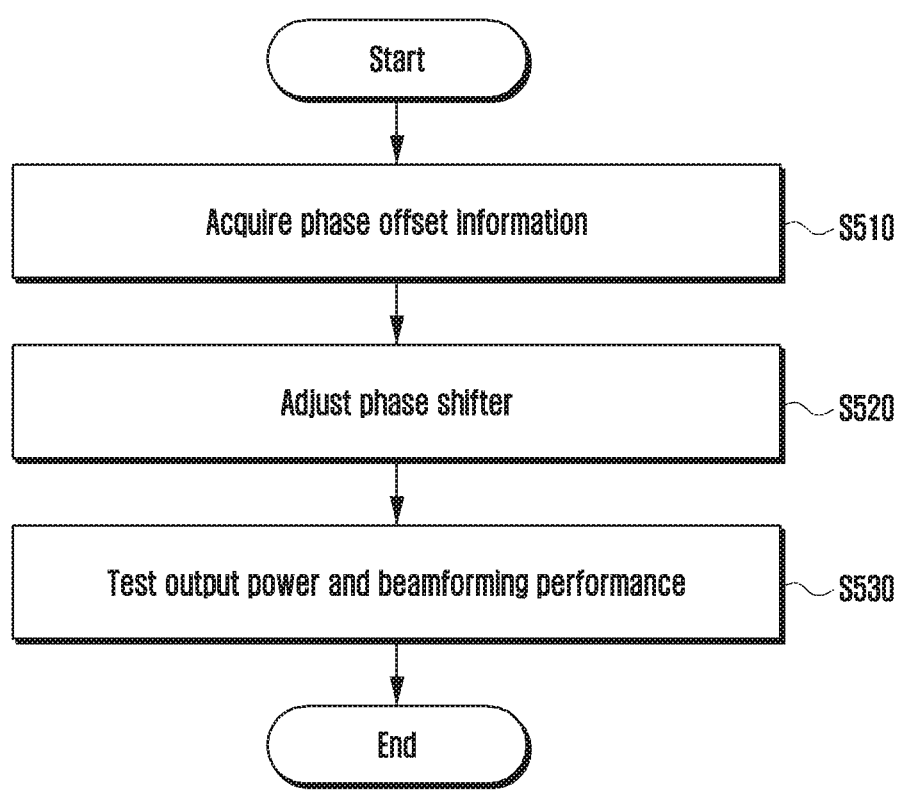
FIG. 5 is a flowchart illustrating a method for testing a wireless communication module according to an embodiment of the disclosure.

FIG. 5 is a flowchart illustrating a method for testing a wireless communication module according to an embodiment of the disclosure.

Referring to FIG. 5, according to an embodiment, at operation S510, phase offset information stored in a memory of a wireless communication module may be acquired. According to various embodiments, the phase offset information may be determined based on a phase difference between the wireless communication module and a reference wireless communication module. For example, the phase offset information may be a phase dispersion value of the wireless communication module.

According to an embodiment, at operation S520, a phase shifter of the wireless communication module may be adjusted based on the phase offset information. For example, if the phase offset information is +10°, the phase dispersion value of the wireless communication module including the phase offset information may be +10°. In this case, if it is intended to form a beam in the direction of +40° through the wireless communication module, the phase shifter may be adjusted as much as +30° in consideration of the phase dispersion value of +10°.

According to an embodiment, at operation S530, the output power or beamforming performance of the wireless communication module may be tested. According to various embodiments, at operation S530, the beamforming performances of a plurality of wireless communication modules included in the electronic device may be tested.

Figure 6:
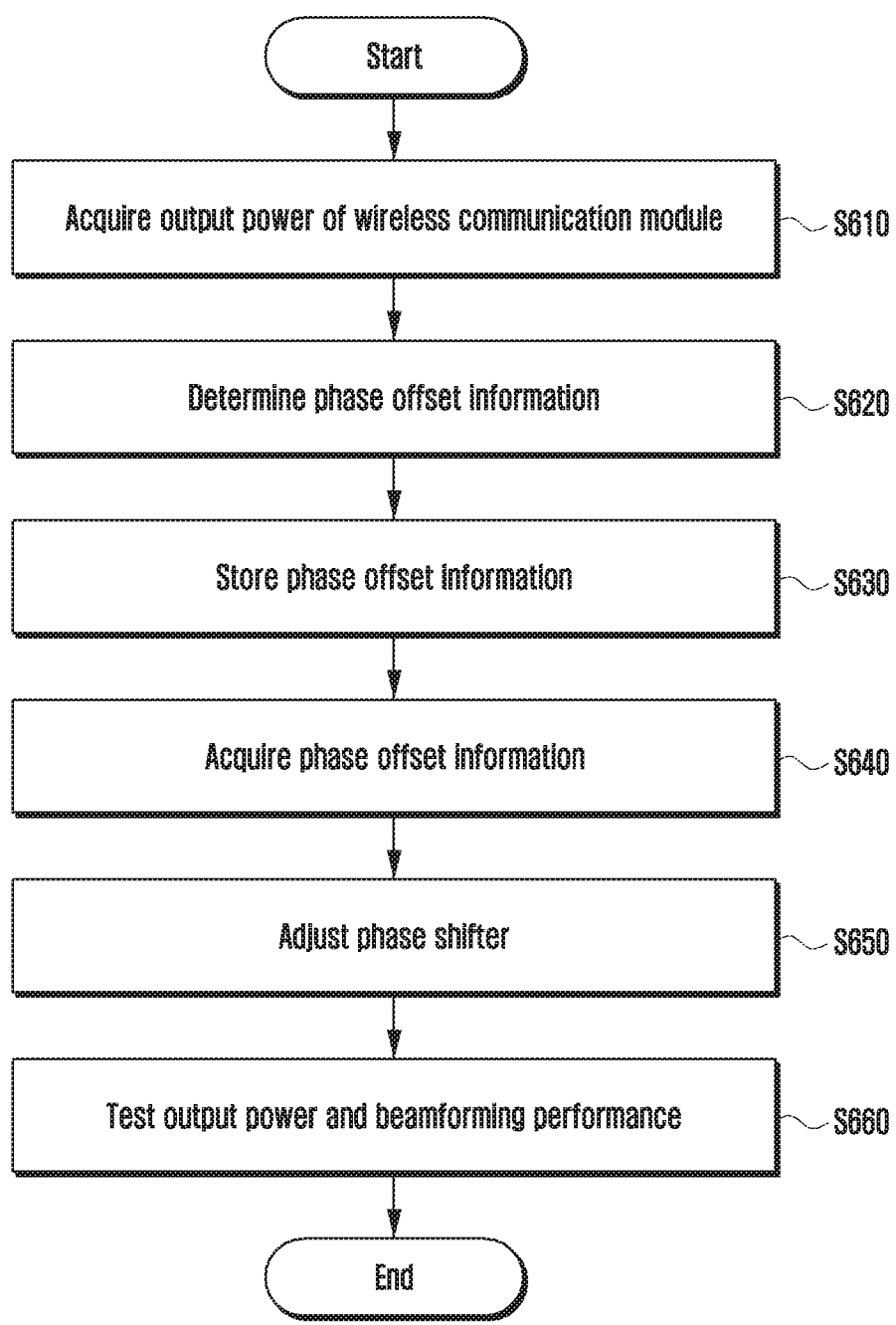
FIG. 6 is a flowchart illustrating a method for testing a wireless communication module including a method for determining phase offset information according to an embodiment of the disclosure.

FIG. 6 is a flowchart illustrating a method for testing a wireless communication module including a method for determining phase offset information according to an embodiment of the disclosure.

Referring to FIG. 6, according to an embodiment, at operation S610, the output power of a wireless communication module and the output power of a reference wireless communication module may be acquired. According to various embodiments, the output power of the wireless communication module and the output power of the reference wireless communication module may be transmitted to a spectrum analyzer, and the sum of the output of the wireless communication module and the output of the reference wireless communication module may be acquired through the spectrum analyzer.

According to an embodiment, at operation S620, phase offset information of the wireless communication module may be determined based on the sum of the output power of the wireless communication module and the output power of the reference wireless communication module. The detailed explanation of operation S620 will be described later with reference to FIGS. 7 to 10.

According to an embodiment, at operation S630, the determined phase offset information may be stored in a memory of the wireless communication module. For example, the phase offset information may be stored in a register included in a wireless communication module processor. According to various embodiments, the phase offset information may be the phase dispersion value of the wireless communication module.

Operations S640, S650, and S660 as illustrated in FIG. 6 may be equal or similar to the operations S510, S520, and S530 as illustrated in FIG. 5. Accordingly, explanation of the operations S640, S650, and S660 of FIG. 6 is replaced by the explanation with reference to FIG. 5.

Figure 7:
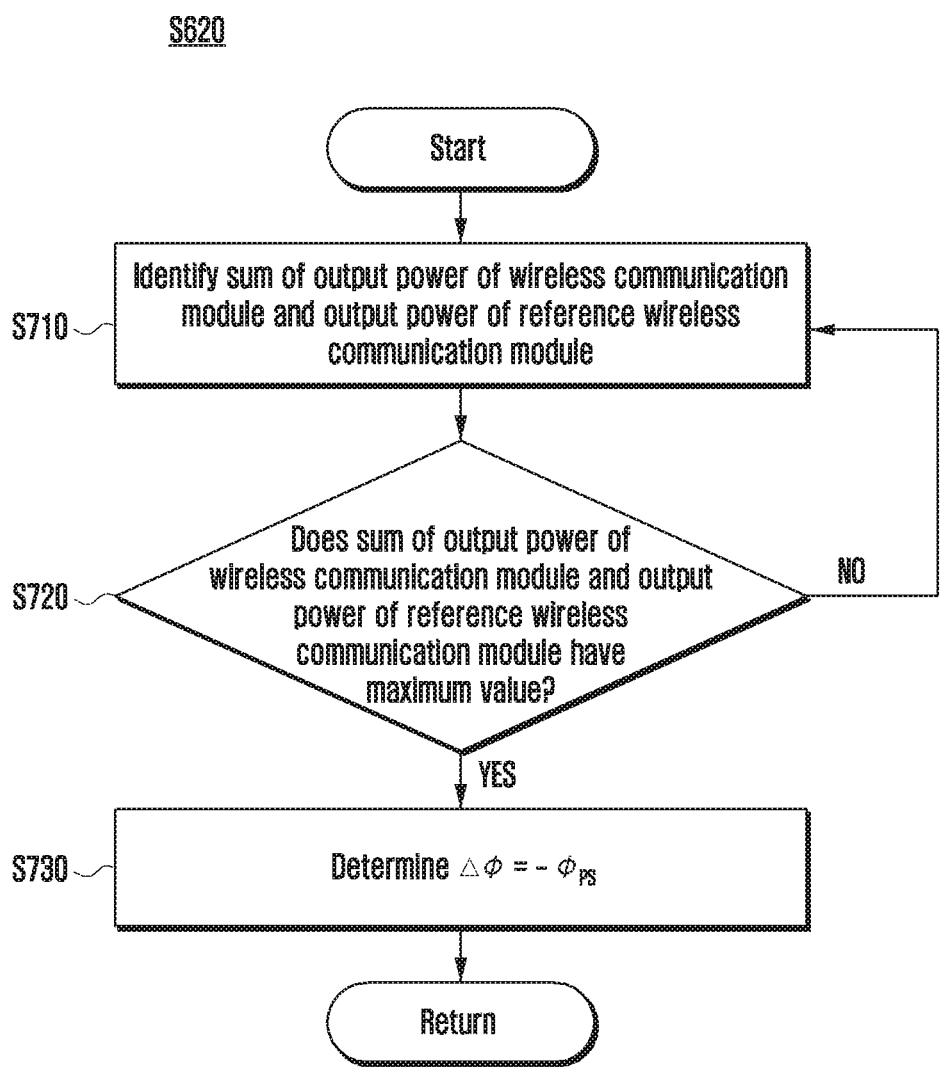
FIG. 7 is a flowchart illustrating a method for determining phase offset information according to an embodiment of the disclosure.

FIG. 7 is a flowchart illustrating a method for determining phase offset information according to a first embodiment of the disclosure. According to an embodiment, the flowchart as illustrated in FIG. 7 may be included in operation S620 of FIG. 6.

Referring to FIG. 7, according to an embodiment, at operation S710, the sum of an output power of a wireless communication module and an output power of a reference wireless communication module may be identified through adjustment of a phase shifter of the wireless communication module. According to various embodiments, an output signal of the wireless communication module and an output signal of the reference wireless communication module may be transmitted to a spectrum analyzer, and the sum of the output power of the wireless communication module and the output power of the reference wireless communication module may be identified through the spectrum analyzer.

According to an embodiment, at operation S720, it may be identified whether the sum of the output power of the wireless communication module and the output power of the reference wireless communication module has the maximum value. According to various embodiments, if the sum of the output power of the wireless communication module and the output power of the reference wireless communication module has the maximum value, the adjustment of the phase shifter may be stopped, and at operation S730, phase offset information of the wireless communication module may be determined. According to an embodiment, if the sum of the output power of the wireless communication module and the output power of the reference wireless communication module does not have the maximum value, the operation returns to the operation S710, and the sum of the output power of the wireless communication module and the output power of the reference wireless communication module may be identified through adjustment of the phase shifter of the wireless communication module.

According to an embodiment, at operation S730, the phase offset information of the wireless communication module may be determined based on the phase value of the phase shifter of the wireless communication module whereby the sum of the output power of the wireless communication module and the output power of the reference wireless communication module has the maximum value. For example, the phase offset information of the wireless communication module may be determined based on Equation 3 below.

$$\Delta\varphi = -\varphi_{PS} \qquad \text{Equation 3}$$

Here, $\Delta\varphi$ denotes phase offset information of the wireless communication module, and $\Phi_{PS}$ denotes a phase value of the phase shifter of the wireless communication module if the sum of the output power of the wireless communication module and the output power of the reference wireless communication module has the maximum value.

Figure 8:
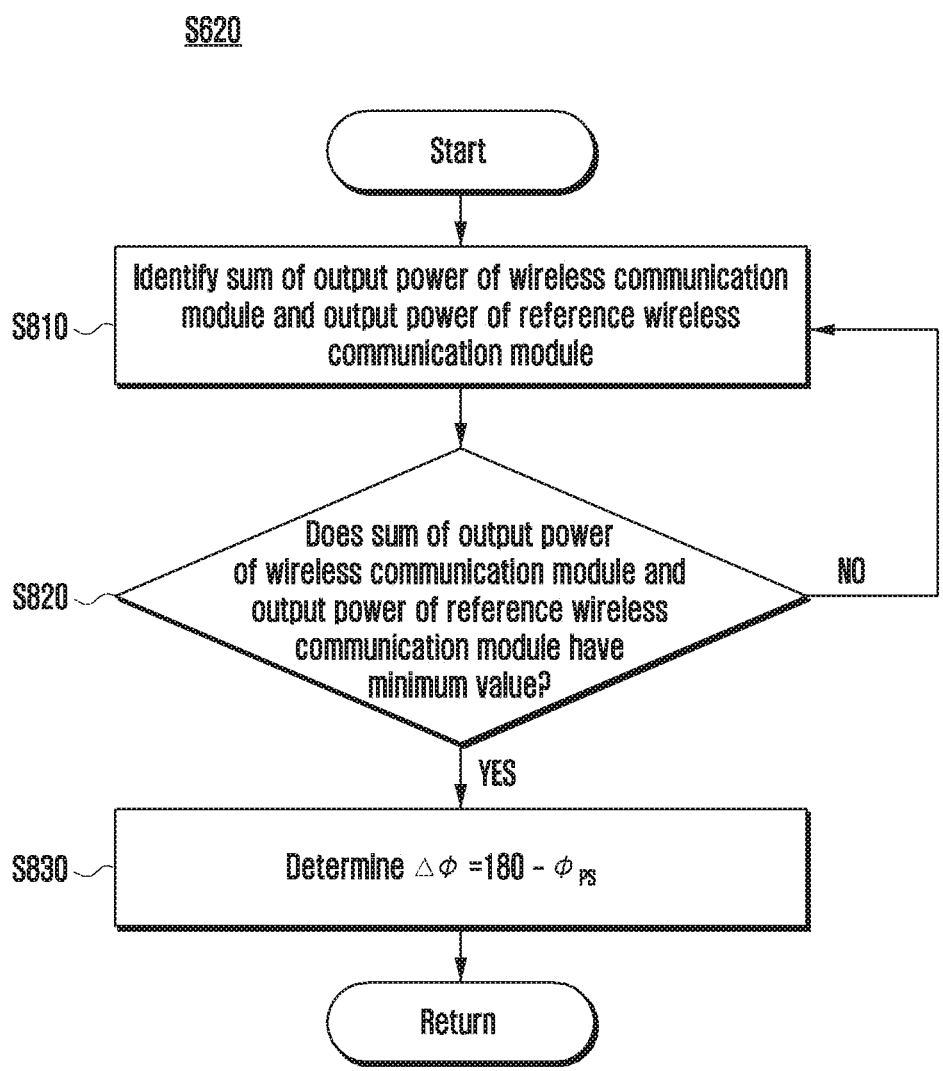
FIG. 8 is a flowchart illustrating a method for determining phase offset information according to an embodiment of the disclosure.

FIG. 8 is a flowchart illustrating a method for determining phase offset information according to a second embodiment of the disclosure. According to an embodiment, the flowchart as illustrated in FIG. 8 may be included in operation S620 of FIG. 6.

Referring to FIG. 8, according to an embodiment, at operation S810, the sum of an output power of a wireless communication module and an output power of a reference wireless communication module may be identified through adjustment of a phase shifter of the wireless communication module. According to various embodiments, an output signal of the wireless communication module and an output signal of the reference wireless communication module may be transmitted to a spectrum analyzer, and the sum of the output power of the wireless communication module and the output power of the reference wireless communication module may be identified through the spectrum analyzer.

According to an embodiment, at operation S820, it may be identified whether the sum of the output power of the wireless communication module and the output power of the reference wireless communication module has the minimum value. According to various embodiments, if the sum of the output power of the wireless communication module and the output power of the reference wireless communication module has the minimum value, the adjustment of the phase shifter may be stopped, and at operation S830, phase offset information of the wireless communication module may be determined. According to an embodiment, if the sum of the output power of the wireless communication module and the output power of the reference wireless communication module does not have the minimum value, the operation returns to the operation S810, and the sum of the output power of the wireless communication module and the output power of the reference wireless communication module may be identified through adjustment of the phase shifter of the wireless communication module.

According to an embodiment, at operation S830, the phase offset information of the wireless communication module may be determined based on the phase value of the phase shifter of the wireless communication module whereby the sum of the output power of the wireless communication module and the output power of the reference wireless communication module has the minimum value. For example, the phase offset information of the wireless communication module may be determined based on Equation 4 below.

$$\Delta\varphi = 180° - \varphi_{PS} \qquad \text{Equation 4}$$

Here, $\Delta\varphi$ denotes phase offset information of the wireless communication module, and $\varphi_{PS}$ denotes a phase value of the phase shifter of the wireless communication module if the sum of the output power of the wireless communication module and the output power of the reference wireless communication module has the minimum value.

Figure 9:
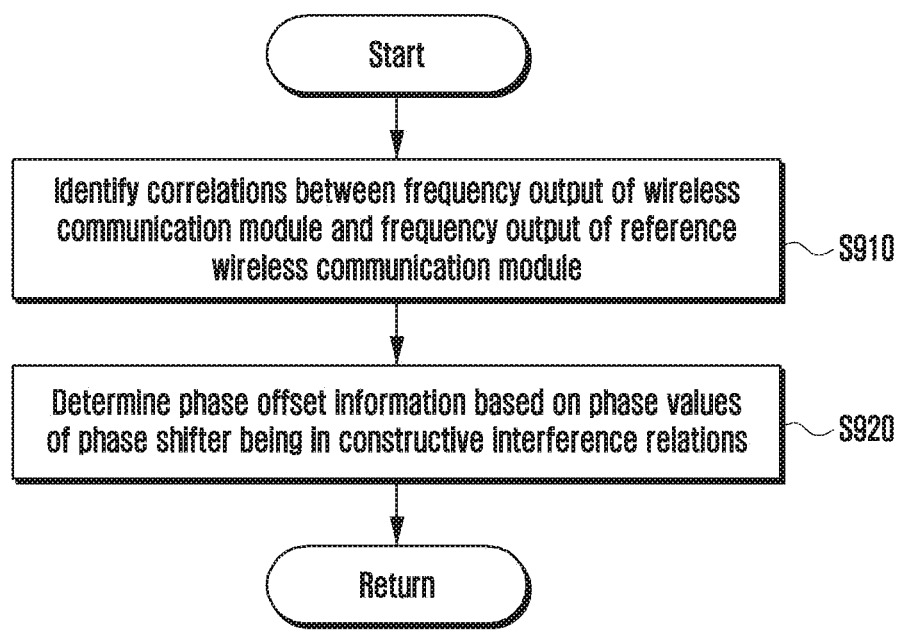
FIG. 9 is a flowchart illustrating a method for determining phase offset information according to an embodiment of the disclosure.

FIG. 9 is a flowchart illustrating a method for determining phase offset information according to a third embodiment of the disclosure. According to an embodiment, the flowchart as illustrated in FIG. 9 may be included in operation S620 of FIG. 6.

Referring to FIG. 9, according to an embodiment, at operation S910, the correlations between a frequency output of a wireless communication module and a frequency output of a reference wireless communication module may be identified through adjustment of a phase shifter of the wireless communication module. According to various embodiments, an output signal of the wireless communication module and an output signal of the reference wireless communication module may be transmitted to a spectrum analyzer, and the correlations between the frequency output of the wireless communication module and the frequency output of the reference wireless communication module may be identified through the spectrum analyzer.

According to an embodiment, at operation S920, phase offset information may be determined based on a phase value of the phase shifter whereby the frequency output of the wireless communication module and the frequency output of the reference wireless communication module are in mutual constructive interference relations. For example, the phase offset information of the wireless communication module may be determined based on Equation 5 below.

$$\Delta\varphi = -\varphi_{PS} \qquad \text{Equation 5}$$

Here, $\Delta\varphi$ denotes phase offset information of the wireless communication module, and $\varphi_{PS}$ denotes a phase value of the phase shifter of the wireless communication module if the frequency output of the wireless communication module and the frequency output of the reference wireless communication module are mutual constructive interferences.

FIG. 10 is a flowchart illustrating a method for determining phase offset information according to a fourth embodiment of the disclosure. According to an embodiment, the flowchart as illustrated in FIG. 10 may be included in operation S620 of FIG. 6.

Referring to FIG. 10, according to an embodiment, at operation S1010, the correlations between a frequency output of a wireless communication module and a frequency output of a reference wireless communication module may be identified through adjustment of a phase shifter of the wireless communication module. According to various embodiments, an output signal of the wireless communication module and an output signal of the reference wireless communication module may be transmitted to a spectrum analyzer, and the correlations between the frequency output of the wireless communication module and the frequency output of the reference wireless communication module may be identified through the spectrum analyzer.

According to an embodiment, at operation S1020, phase offset information may be determined based on a phase value of the phase shifter whereby the frequency output of the wireless communication module and the frequency output of the reference wireless communication module are in mutual destructive interference relations. For example, the phase offset information of the wireless communication module may be determined based on Equation 6 below.

$$\Delta\varphi = 180° - \varphi_{PS} \qquad \text{Equation 6}$$

Here, $\Delta\varphi$ denotes phase offset information of the wireless communication module, and $\varphi_{PS}$ denotes a phase value of the phase shifter of the wireless communication module if the frequency output of the wireless communication module and the frequency output of the reference wireless communication module are mutual constructive interferences.

The disclosure provides an electronic device including a wireless communication module, wherein the wireless communication module includes an antenna array including at least one antenna element, a phase shifter configured to control a phase of a beam radiating from the antenna array, a processor electrically connected to the phase shifter and configured to perform beamforming by controlling the phase shifter, and a memory including phase offset information of the wireless communication module.

The phase offset information may be determined based on a phase difference between the wireless communication module and a reference wireless communication module.

If the beam radiating through the wireless communication module and a beam radiating through a reference wireless communication module act mutually as constructive interferences, the phase offset information may be determined based on a phase value being controlled by a phase shifter included in the wireless communication module.

If the beam radiating through the wireless communication module and a beam radiating through a reference wireless communication module act mutually as destructive interferences, the phase offset information may be determined based on a phase value being controlled by a phase shifter included in the wireless communication module.

If a sum of a power of the beam radiating through the wireless communication module and a power of a beam radiating through a reference wireless communication module has a maximum value, the phase offset information may be determined based on a phase value being controlled by a phase shifter included in the wireless communication module.

If a sum of a power of the beam radiating through the wireless communication module and a power of a beam radiating through a reference wireless communication module has a minimum value, the phase offset information may be determined based on the phase value being controlled by a phase shifter included in the wireless communication module.

The disclosure provides a method for testing a wireless communication module which includes acquiring phase offset information stored in a memory of the wireless communication module, adjusting a phase shifter of the wireless communication module based on the phase offset information, and testing an output power and beamforming performance of the wireless communication module.

The method may include acquiring the output power of the wireless communication module and an output power of a reference wireless communication module before acquiring the phase offset information, determining the phase offset information based on a sum of the output power of the wireless communication module and the output power of the reference wireless communication module, and storing the determined phase offset information in the memory.

Determining the phase offset information may include identifying a sum of the output power of the wireless communication module and the output power of the reference wireless communication module by adjusting the phase shifter, and determining the phase offset information based on a phase value of the phase shifter whereby the sum of the output power of the wireless communication module and the output power of the reference wireless communication module has a maximum value.

Determining the phase offset information may include identifying a sum of the output power of the wireless communication module and the output power of the reference wireless communication module by adjusting the phase shifter, and determining the phase offset information based on a phase value of the phase shifter whereby the sum of the output power of the wireless communication module and the output power of the reference wireless communication module has a minimum value.

Determining the phase offset information may include identifying correlations between a frequency output of the wireless communication module and a frequency output of the reference wireless communication module by adjusting the phase shifter, and determining the phase offset information based on a phase value of the phase shifter whereby the frequency output of the wireless communication module and the frequency output of the reference wireless communication module are in mutual constructive interference relations.

Determining the phase offset information may include identifying correlations between a frequency output of the wireless communication module and a frequency output of the reference wireless communication module by adjusting the phase shifter, and determining the phase offset information based on a phase value of the phase shifter whereby the frequency output of the wireless communication module and the frequency output of the reference wireless communication module are in mutual destructive interference relations.

The disclosure provides a base station including a wireless communication module, wherein the wireless communication module includes an antenna array including at least one antenna element, a phase shifter configured to control a phase of a beam radiating from the antenna array, a processor electrically connected to the phase shifter and configured to perform beamforming by controlling the phase shifter, and a memory including phase offset information of the wireless communication module.

The phase offset information may be determined based on a phase difference between the wireless communication module and a reference wireless communication module.

If the beam radiating through the wireless communication module and a beam radiating through a reference wireless communication module act mutually as constructive interferences, the phase offset information may be determined based on a phase value being controlled by a phase shifter included in the wireless communication module.

If the beam radiating through the wireless communication module and a beam radiating through a reference wireless communication module act mutually as destructive interferences, the phase offset information may be determined based on a phase value being controlled by a phase shifter included in the wireless communication module.

If a sum of a power of the beam radiating through the wireless communication module and a power of a beam radiating through a reference wireless communication module has a maximum value, the phase offset information may be determined based on a phase value being controlled by a phase shifter included in the wireless communication module.

If a sum of a power of the beam radiating through the wireless communication module and a power of a beam radiating through a reference wireless communication module has a minimum value, the phase offset information may be determined based on a phase value being controlled by a phase shifter included in the wireless communication module.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   at least one wireless communication module,
   wherein each of the at least one wireless communication module comprises:
      an antenna array including at least one antenna element;
      a phase shifter configured to control a phase of a beam radiating from the antenna array;
      a processor connected to the phase shifter and configured to perform beamforming by controlling the phase shifter; and
      a memory,
   wherein tests for an output power and beamforming performance of a wireless communication module among the at least one wireless communication module are performed after adjusting a phase shifter of the wireless communication module,
   wherein the phase shifter of the wireless communication module is adjusted based on phase offset information stored in a memory of the wireless communication module,
   wherein the phase offset information is determined based on a phase difference between the wireless communication module and a reference wireless communication module, and
   wherein the phase difference is based on a relationship between a frequency output of the wireless communication module and a frequency output of the reference wireless communication module, or a relationship between an output power of the wireless communication module and an output power of the reference wireless communication module.

2. The electronic device of claim 1, wherein the phase offset information is determined based on the phase difference whereby the frequency output of the wireless communication module and the frequency output of the reference wireless communication module are in mutual constructive interference relations.

3. The electronic device of claim 1, wherein the phase offset information is determined based on the phase difference whereby the frequency output of the wireless communication module and the frequency output of the reference wireless communication module are in mutual destructive interference relations.

4. The electronic device of claim 1, wherein the phase offset information is determined based on the phase difference whereby a sum of the output power of the wireless communication module and the output power of the reference wireless communication module has a maximum value.

5. The electronic device of claim 1, wherein the phase offset information is determined based on the phase difference whereby a sum of the output power of the wireless communication module and the output power of the reference wireless communication module has a minimum value.

6. A method for testing a wireless communication module, the method comprising:
   determining phase offset information based on a phase difference between the wireless communication module and a reference wireless communication module;
   storing the phase offset information in a memory of the wireless communication module;
   adjusting a phase shifter of the wireless communication module based on the phase offset information; and
   performing tests for an output power and beamforming performance of the wireless communication module based on the adjustment of the phase shifter,
   wherein the phase difference is based on a relationship between a frequency output of the wireless communication module and a frequency output of the reference wireless communication module, or a relationship between an output power of the wireless communication module and an output power of the reference wireless communication module.

7. The method of claim 6, wherein the determining of the phase offset information comprises:
   obtaining the output power of the wireless communication module and the output power of the reference wireless communication module; and
   determining the phase offset information based on a sum of the output power of the wireless communication module and the output power of the reference wireless communication module.

8. The method of claim 7, wherein the determining of the phase offset information comprises:
   determining the phase offset information based on the phase difference whereby the sum of the output power of the wireless communication module and the output power of the reference wireless communication module has a maximum value.

9. The method of claim 7, wherein the determining of the phase offset information comprises:
   determining the phase offset information based on the phase difference whereby the sum of the output power of the wireless communication module and the output power of the reference wireless communication module has a minimum value.

10. The method of claim 6, wherein the determining of the phase offset information comprises:
    determining the phase offset information based on the phase difference whereby the frequency output of the wireless communication module and the frequency output of the reference wireless communication module are in mutual constructive interference relations.

11. The method of claim 6, wherein the determining of the phase offset information comprises:
determining the phase offset information based on the phase difference whereby the frequency output of the wireless communication module and the frequency output of the reference wireless communication module are in mutual destructive interference relations.

12. A base station comprising:
at least one wireless communication module,
wherein each of the at least one wireless communication module comprises:
an antenna array including at least one antenna element;
a phase shifter configured to control a phase of a beam radiating from the antenna array;
a processor connected to the phase shifter and configured to perform beamforming by controlling the phase shifter; and
a memory,
wherein tests for an output power and beamforming performance of a wireless communication module among the at least one wireless communication module are performed after adjusting a phase shifter of the wireless communication module,
wherein the phase shifter of the wireless communication module is adjusted based on phase offset information stored in a memory of the wireless communication module,
wherein the phase offset information is determined based on a phase difference between the wireless communication module and a reference wireless communication module, and
wherein the phase difference is based on a relationship between a frequency output of the wireless communication module and a frequency output of the reference wireless communication module, or a relationship between an output power of the wireless communication module and an output power of the reference wireless communication module.

13. The base station of claim 12, wherein the phase offset information is determined based on the phase difference whereby the frequency output of the wireless communication module and the frequency output of the reference wireless communication module are in mutual constructive interference relations.

14. The base station of claim 12, wherein the phase offset information is determined based on the phase difference whereby the frequency output of the wireless communication module and the frequency output of the reference wireless communication module are in mutual destructive interference relations.

15. The base station of claim 12, wherein the phase offset information is determined based on the phase difference whereby a sum of the output power of the wireless communication module and the output power of the reference wireless communication module has a maximum value.

16. The base station of claim 12, wherein the phase offset information is determined based on the phase difference whereby a sum of the output power of the wireless communication module and the output power of the reference wireless communication module has a minimum value.

* * * * *